United States Patent
Rempel (10) Patent No.: US 10,951,339 B2
(45) Date of Patent: Mar. 16, 2021

(54) SIMULTANEOUS SAMPLING RATE ADAPTATION AND DELAY CONTROL

(71) Applicant: Telefonaktiebolaget LM Ericsson (publ), Stockholm (SE)

(72) Inventor: Glen Rempel, Kanata (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/621,435

(22) PCT Filed: Jun. 26, 2017

(86) PCT No.: PCT/IB2017/053806
§ 371 (c)(1),
(2) Date: Dec. 11, 2019

(87) PCT Pub. No.: WO2019/002911
PCT Pub. Date: Jan. 3, 2019

(65) Prior Publication Data
US 2020/0204282 A1 Jun. 25, 2020

(51) Int. Cl.
*H04J 3/06* (2006.01)
*H04W 56/00* (2009.01)

(52) U.S. Cl.
CPC ....... *H04J 3/0682* (2013.01); *H04W 56/0055* (2013.01)

(58) Field of Classification Search
CPC .......... H04J 3/06; H04J 3/0682; H04J 3/0685; H04J 3/0691; H04J 3/0694; H04J 3/0697; H04W 56/0055
See application file for complete search history.

(56) References Cited

U.S. PATENT DOCUMENTS 6,252,919 B1* 6/2001 Lin .................. G10L 21/04
375/355
7,010,370 B1* 3/2006 Riegelsberger ......... G10L 19/00
381/63

(Continued)

FOREIGN PATENT DOCUMENTS

EP 1749362 A1 2/2007
WO 99/35876 A1 7/1999

OTHER PUBLICATIONS

International Search Report and Written Opinion of the International Searching Authority dated Apr. 5, 2018 issued in PCT Application No. PCT/IB2017/053806, consisting of 15 pages.

*Primary Examiner* — Kevin D Mew
(74) *Attorney, Agent, or Firm* — Christopher & Weisberg, P.A.

(57) ABSTRACT

A variable delay interface configured to introduce a controllable, variable delay between a radio equipment controller and a radio equipment is provided. The interface includes a variable rate change filter, VRCF, having a signal input, a signal output and a rate control input. The VRCF is configured to receive a rate control signal at the rate control inputs and sample an input signal received at the signal input at a sampling rate controlled by a rate control signal to produce a VRCF output signal. The sampling rate is one of greater than and less than a sampling rate of the input signal. The VRCF has a first delay. The interface includes a first in first out, FIFO, buffer having an input and an output, the FIFO buffer configured to store samples of the VRCF output signal received at the FIFO buffer.

21 Claims, 5 Drawing Sheets

(56) References Cited

U.S. PATENT DOCUMENTS

| | | | |
|---|---|---|---|
| 7,940,667 B1* | 5/2011 | Coady | H04J 3/0691 |
| | | | 370/238 |
| 2004/0019277 A1* | 1/2004 | Bae | G01S 7/52023 |
| | | | 600/437 |
| 2011/0150158 A1* | 6/2011 | Yamaguchi | H04J 3/0685 |
| | | | 375/355 |
| 2013/0121240 A1* | 5/2013 | Przada | H04J 3/0682 |
| | | | 370/328 |

* cited by examiner

SIMULTANEOUS SAMPLING RATE ADAPTATION AND DELAY CONTROL

CROSS-REFERENCE TO RELATED APPLICATIONS

This application is a Submission Under 35 U.S.C. § 371 for U.S. National Stage Patent Application of International Application No. PCT/IB2017/053806, filed Jun. 26, 2017 entitled "SIMULTANEOUS SAMPLING RATE ADAPTATION AND DELAY CONTROL," the entirety of which is incorporated herein by reference.

TECHNICAL FIELD

This disclosure relates to wireless communication and in particular, to a variable delay interface.

BACKGROUND

Figure 1:
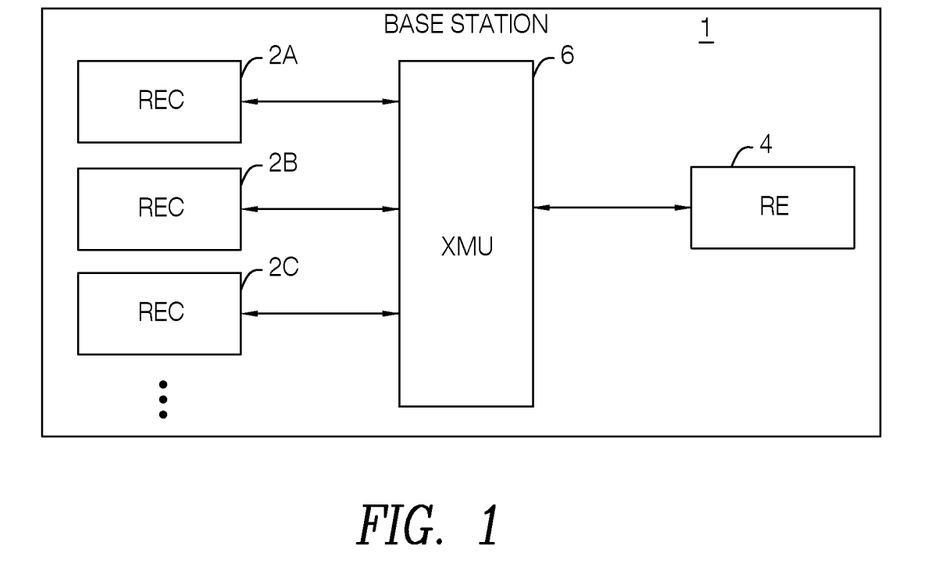
FIG. 1 is a block diagram of an auxiliary multiplexer/demultiplexer (XMU) serving as an interface between radio equipment controllers and radio equipment.

Mixed wireless standard base stations, i.e., base stations (BS) are equipped to provide radio communication according to different radio access technologies (RANs). As shown in FIG. 1, a mixed wireless standard base station typically has multiple radio equipment controllers (RECs), 2A-2C, referred to collectively herein as RECs 2, connected to a single unit of radio equipment (RE) 4 via a multiplexing/demultiplexing unit (XMU) 6 which provides a common interface to the RE 4. The RECs 2 serve to perform baseband processing and generate IQ samples according to a particular radio access technology. The RE 4 receives IQ samples from the RECs 2 via the XMU 6 and transmits an RF signal containing the information of the IQ samples to a wireless device on the downlink. On the uplink, the RE 4 receives information signals from a wireless device, down-converts the received signals and transmits an intermediate frequency (IF) or baseband signal having IQ samples via the XMU 6 to be processed by an REC 2.

Figure 2:
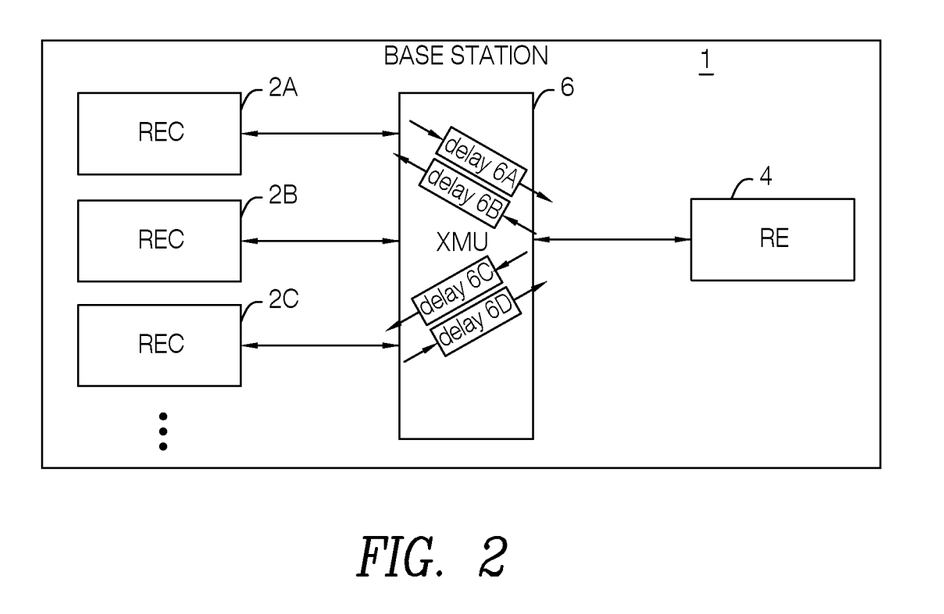
FIG. 2 is a block diagram showing different delays in different paths through the XMU.

Sometimes, as for example when RECs 2 are provided by different vendors, the RECs 2 may have ports that are unsynchronized. In such cases, it may be necessary for the XMU 6 to provide rate adaptation between the RECs 2 and the RE 4. I/Q samples from the various RECs 2 are resampled to a common rate for transmission to the RE 4. Likewise, I/Q samples from the RE 4 are resampled to the rate specific to a given REC 2. These rate adaptations are shown in FIG. 2 by the delays 6A-6D. This might be satisfactory when the required delay is fixed. However, delay is not fixed because the sample rate is a stochastic process. Thus, fixed rate adaptation leads to uncontrollable delay and the potential for lost data. However, additional delay constraints may be imposed on the fly so that dynamic control of the precise delay of the XMU 6 is sometimes required.

SUMMARY

A variable delay interface and method to introduce a controllable, variable delay between a first and second equipment are provided. According to one aspect, the variable delay interface includes a variable rate change filter, VRCF, having a signal input, a signal output, and a rate control input. The VRCF is configured to receive a rate control signal at the rate control input and sample an input signal received at the signal input at a sampling rate controlled by the rate control signal to produce a VRCF output signal. Also, the VRCF has a first delay. The variable delay interface includes a first in first out, FIFO, buffer having an input and an output, the FIFO buffer configured to store samples of the VRCF output signal received at the FIFO buffer input and introduce a second delay in the stored samples to produce a FIFO buffer output signal at the FIFO buffer output. A delay control unit is configured to add the first and second delays to produce a total delay. The delay control unit is also configured to compare the total delay to a target delay and generate the rate control signal based on the comparison. The delay control unit outputs the rate control signal to the VRCF rate control input, the rate control signal causing one of no change, an increase and a decrease of the sampling rate of the VRCF.

According to this aspect, in some embodiments, the first equipment is a radio equipment controller and the second equipment is a radio equipment. In some embodiments, when the total delay is less than the target delay, the rate control signal causes an increase in the sampling rate of the VRCF. In some embodiments, when the total delay is greater than the target delay, the rate control signal causes a decrease in the sampling rate of the VRCF. In some embodiments, the rate control signal is generated by a loop filter. In some embodiments, the first delay is a fraction of a time between samples of the VRCF output signal. In some embodiments, the second delay is an integer multiple of a time between samples of the VCRF output signal.

In some embodiments, the FIFO buffer is responsive to an input clock and an output clock, the input clock being received from the first equipment and the output clock being received from the second equipment. In some embodiments, a fixed delay is introduced into a path of a write enable signal to the FIFO buffer to add delay to the second delay. In some embodiments, a deframing unit is in communication with the input of the VRCF to interface between the first equipment and the VRCF and a framing unit is in communication with the output of the FIFO buffer to interface between the FIFO buffer and the second equipment.

According to another aspect, a method of introducing a controllable, variable delay between a first equipment and a second equipment is provided. The method includes receiving at a rate control input of a variable rate change filter, VRCF, a rate control signal. The method includes sampling by the VRCF an input signal at a sampling rate controlled by the rate control signal to produce a VRCF output signal, the VRCF having a first delay. The method also includes storing in a first in first out, FIFO, buffer, samples of the VRCF output signal and introducing a second delay in the stored samples to produce a FIFO buffer output signal. The method further includes adding the first and second delays to produce a total delay, comparing the total delay to a target delay and generating the rate control signal based on the comparison. The method further includes outputting the rate control signal to the VRCF rate control input, the rate control signal causing one of no change, an increase and a decrease of the sampling rate of the VRCF.

According to this aspect, in some embodiments, the first equipment is a radio equipment controller and the second equipment is a radio equipment. In some embodiments, when the total delay is less than the target delay, the rate control signal causes an increase in the sampling rate of the VRCF. In some embodiments, when the total delay is greater than the target delay, the rate control signal causes a decrease in the sampling rate of the VRCF. In some embodiments, the rate control signal is generated by a loop filter. In some embodiments, the first delay is a fraction of a time between samples of the VRCF output signal. In some embodiments, the second delay is an integer multiple of a time between samples of the VCRF output signal. In some embodiments, the FIFO buffer is responsive to an input clock and an output clock, the input clock received from the first equipment and the output clock received from the second equipment. In some embodiments, the method includes providing a fixed delay introduced into a path of a write enable signal to the FIFO buffer to add delay to the second delay. In some embodiments, the method includes providing a deframing unit in communication with the VRCF to interface between the first equipment and the VRCF and providing a framing unit in communication with to the FIFO buffer to interface between the FIFO buffer and the second equipment.

According to yet another aspect, a variable delay interface configured to introduce a controllable, variable delay between a radio equipment controller and a radio equipment is provided. The interface includes a variable rate change filter, VRCF, having a signal input, a signal output and a rate control input. The VRCF is configured to receive a rate control signal at the rate control inputs and sample an input signal received at the signal input at a sampling rate controlled by a rate control signal to produce a VRCF output signal. The sampling rate is one of greater than and less than a sampling rate of the input signal. The VRCF has a first delay. The interface includes a first in first out, FIFO, buffer having an input and an output, the FIFO buffer configured to store samples of the VRCF output signal received at the FIFO buffer.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to a variable delay interface. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments advantageously provide a method and system for simultaneous sampling frequency adaptation and controlled delay through an auxiliary multiplexing/demultiplexing unit (XMU), achieved by using a control loop involving a variable rate change filter (VRCF) and a first in/first out (FIFO) buffer, each with delay measurement capability, and including a loop filter to generate a rate control signal to control a sampling frequency of the variable rate change filter (VRCF).

Some embodiments provide continuous control of both the delay and rate adaptation frequency within an interface unit, such as an XMU, with reduced amounts of logic and negligible amounts of software intervention as might otherwise be used. The solutions provided herein can be applied to any system which has a synchronously sampled signal in a plesio-synchronously-timed network. Examples of such a signal might be a sampled voice signal in a T1 network, sampled video signals in a national television system committee (NTSC) network or phase alternating line (PAL) network, sampled radio signals in a common public radio interface (CPRI) or Open Base Station Architecture Initiative (OBSAI) network. Of particular interest is the CPRI network, because the CPRI network often has stringent delay and signal integrity requirements.

Figure 3:
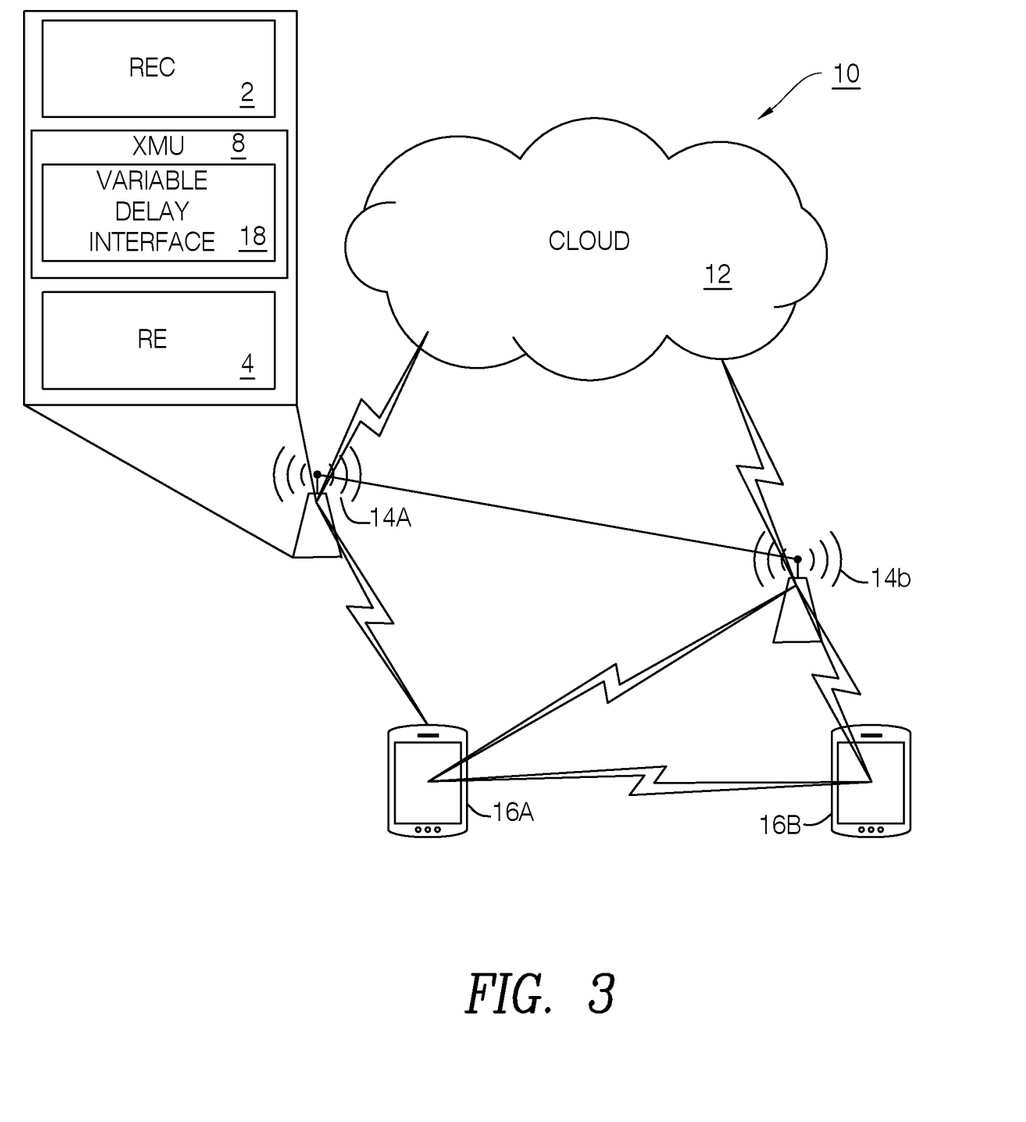
FIG. 3 is a block diagram of a communication network constructed in accordance with principles set forth herein.

Returning now to the drawing figures where like reference designators refer to like elements, there is shown in FIG. 3 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by a network node 14, it is understood that the functions can be performed in other network nodes and elements. It is also understood that the functions of the network node 14 can be distributed across network cloud 12 so that other nodes can perform one or more functions or even parts of functions described herein.

The network nodes 14 may include an REC 2 and an RE 4 connected by an XMU 8. The XMU 8 includes a variable delay interface 18 constructed in accordance with principles described herein. In some embodiments, there are multiple RECs 2 and respective multiple variable delay interfaces 18. Further, in some embodiments, the variable delay interfaces may be separate from the XMU 8.

Figure 4:
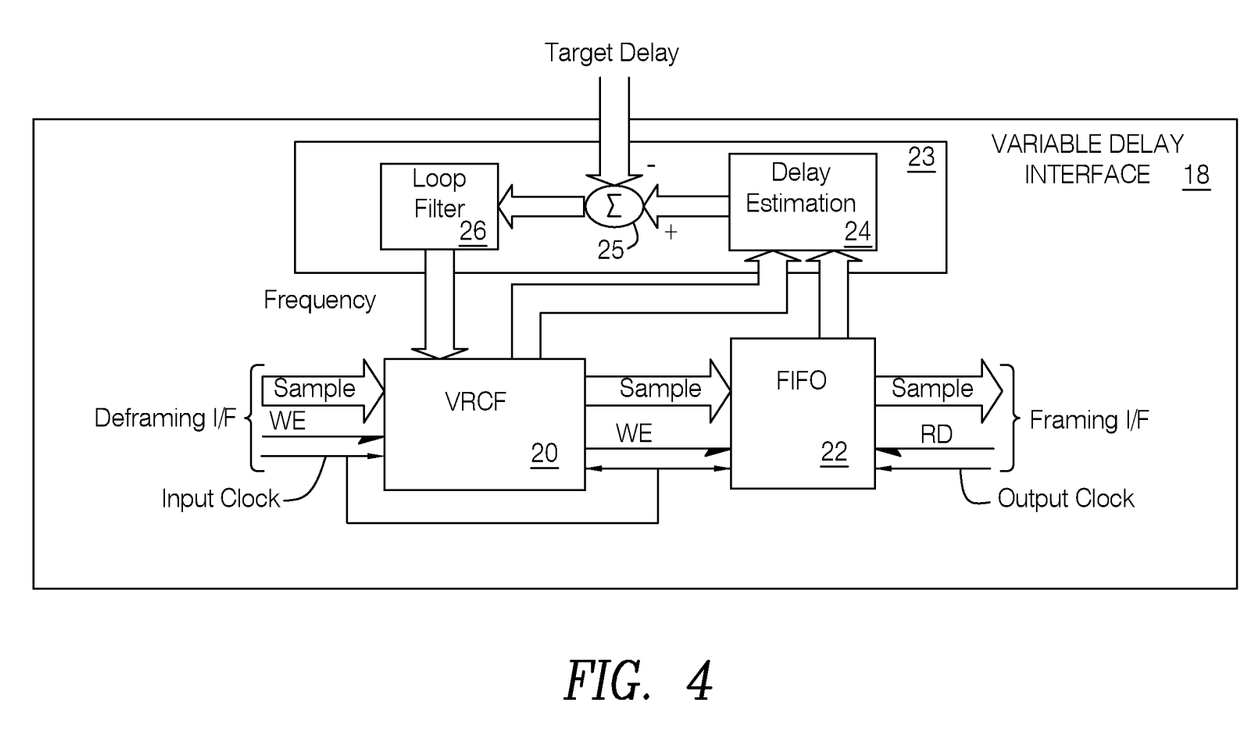
FIG. 4 is a block diagram of a variable delay interface constructed in accordance with principles set forth herein.

A block diagram of such a variable delay interface 18 is shown in FIG. 4. The variable delay interface 18 includes a variable rate change filter (VRCF) 20, a first in first out (FIFO) buffer 22, and a delay control unit 23. The delay control unit 23 has a delay estimation unit 24, a subtractor 25 and a loop filter 26.

The VRCF 20 may be implemented by a programmable digital signal processor or by application specific circuitry, and functions to change a sampling rate of an input signal and to delay the input signal by a fraction of the sampling period. The input signal to the VRCF 20 is a sequence of samples of a signal obtain by deframing a signal from an REC or an RE. The VRCF 20 may sample the input signal at a rate that exceeds or is below a sampling rate of the input signal. An output rate larger than the input rate produces samples with an ever increasing delay until ultimately the process rolls over and, in one input interval, the process produces one sample with a big delay and one with a tiny delay. The VRCF 20 makes the samples look smooth at the output of the FIFO buffer 22, even though the VRCF 20 itself is producing the extra samples to match the rates at mostly unpredictable times. The sampling rate of the VRCF 20 is controlled by a rate control signal obtained from a feedback loop that includes the delay estimation unit 24, the subtractor 25 and the loop filter 26. In some embodiments, the VRCF 20 can produce either N, N−1 or N+1 output samples per input sample, where N is typically equal to 1.

The FIFO buffer 22 provides a controllable delay that is an integer number of input samples received from the VRCF 20. The output of the FIFO buffer 22 is a sequence of delayed samples that have a sampling rate that may be greater than or less than the sampling rate of the input signal to the VRCF 20. This output signal is framed to produce a signal to be received from an RE or an REC. The delay introduced by the FIFO buffer 22 is proportional to a number of samples in the FIFO buffer 22. When more samples are in the FIFO buffer the delay of the FIFO buffer increases, whereas when fewer samples are in the FIFO buffer the delay of the FIFO buffer decreases.

The number of samples in the FIFO buffer 22 is controlled by the rate at which samples are provided to the FIFO buffer 22 by the VRCF 20. When the number of samples per unit time from the VRCF 20 increases, the delay of the FIFO buffer 22 increases. When the number of samples per unit time from the VRCF 20 decreases, the delay of the FIFO buffer decreases.

Internally, the FIFO buffer 22 achieves the delay by measuring the number of samples difference between input and output pointers and also the time difference between write and read instances. The time difference changes as a function of the phase difference between write and read clocks that clock the FIFO buffer 22.

The delay estimation unit 24 receives a delay value from the VRCF 20 and a delay value from the FIFO 22 and adds these delay values to determine the total delay through the variable delay interface 18. The VRCF delay is a function of the VRCF state. The FIFO buffer delay is function of its fill level and relative time between ticks of read and write clocks.

The subtractor 25 determines the difference between the total delay output from the delay estimation unit 24 and a target delay value that is the desired delay of the variable delay interface 18. The desired delay corresponds to a delay to be introduced between an REC and an RE so that all similarly situated RECs are interfaced to the RE in such a way as to synchronize the inputs to the RE from the RECs.

The loop filter 26 receives the difference between the target delay and the total delay output of the delay estimation unit 24 and filters this difference to produce a rate control signal that is output by the loop filter and input to the VRCF 20 and that controls the sampling frequency and delay of the VRCF 20. The sampling frequency is adjusted in such a way as to increase the sampling frequency of the VRCF 20 when the output of the subtractor 25 indicates that the delay of the VRCF 20 and FIFO 22 is too low (total delay output less than the target delay) and to decrease the sampling frequency of the VRCF 20 when the output of the subtractor 25 indicates that the delay of the VRCF 20 and FIFO 22 is too high (total delay output greater than the target delay).

For example, as the VRCF 20 provides an extra sample (a step increase in the delay of the FIFO buffer), the VRCF delay has a step decrease of the same amount. Likewise, if the VRCF 20 does not produce a sample in a time interval, the VRCF delay has a step increase in delay to match. The smooth, continuous delay output allows control logic to function to provide feedback in the form of a rate control signal to the VRCF 20. The desired delay is subtracted from the measured delay from the delay estimation unit 24 via the subtractor 25 and the resultant error is fed to the loop filter 26. The output of this loop filter 26 is used to set the frequency input of the VRCF. The net result is as follows:

If the delay is too low, the VRCF 20 will increase its delay, ultimately dumping samples onto the FIFO buffer 22 until the total delay output matches the target delay.

If the delay is too large, the VRCF 20 will decrease its delay, ultimately drawing down samples on the FIFO buffer 22 until the total delay output matches the target delay.

If the output sampling frequency of the VRCF 20 is higher than the input sampling frequency, the delay through the FIFO buffer 22 will be reduced as the phase difference between the write and read pointers changes and the number of samples in the FIFO buffer 22 decreases. The VRCF 20 will respond by increasing its delay and putting an exactly corresponding number of samples into the FIFO buffer 22.

If the output sampling frequency of the VRCF 20 is lower than the input sampling frequency, the delay through the FIFO buffer 22 will be increased as the phase difference between the write and read pointers changes and the number of samples in the FIFO buffer 22 increases. The VRCF 20 will respond by decreasing its delay and reducing the number of samples put into the FIFO buffer 22 by an exactly corresponding number.

Figure 5:
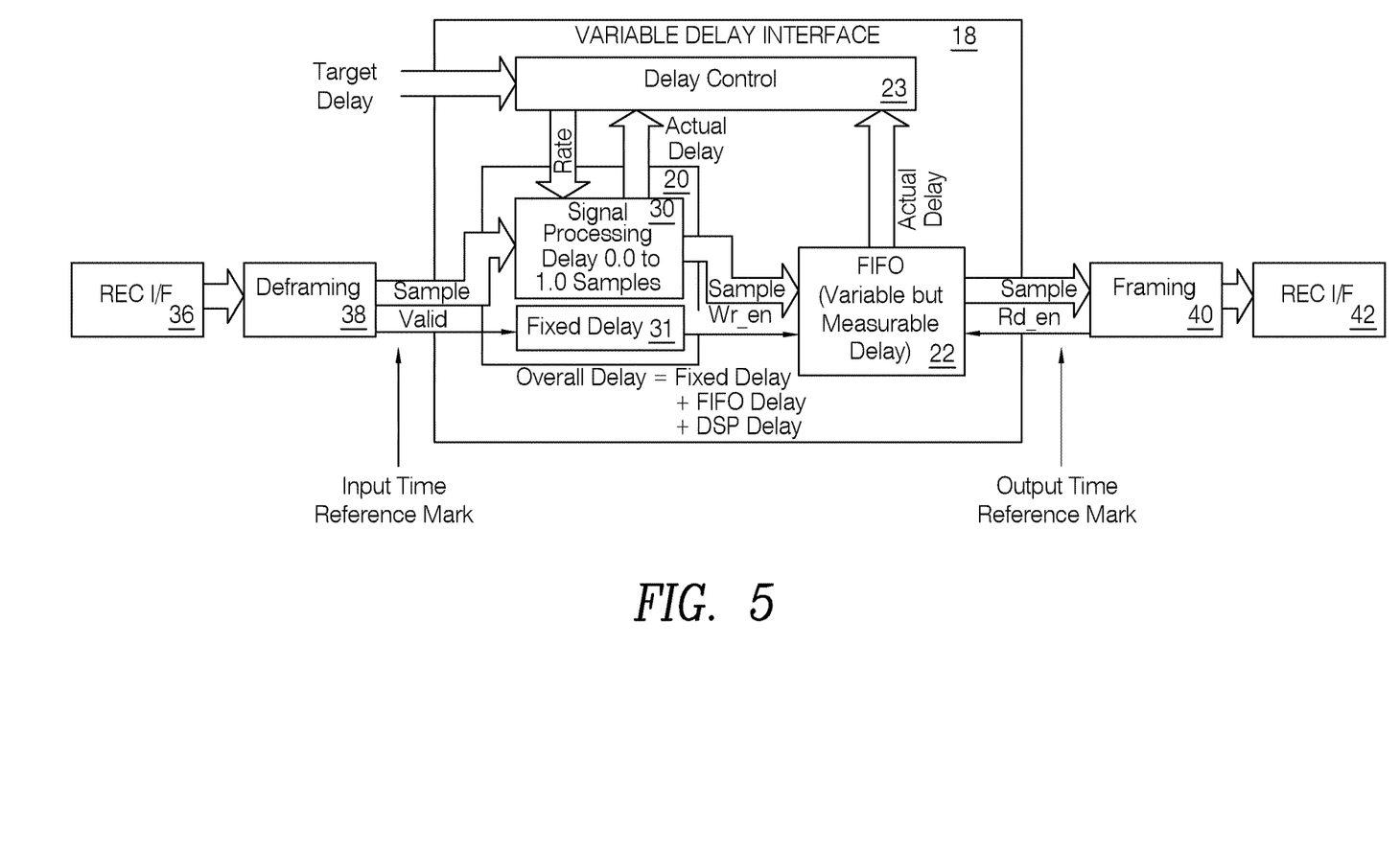
FIG. 5 is a more detailed block diagram of a variable delay interface constructed in accordance with principles set forth herein.

A more detailed block diagram of an embodiment of a variable delay interface 18 is shown in FIG. 5. A VRCF 20 includes a signal processing delay unit 30 that operates to introduce a fractional delay into an input signal, i.e., a delay that is a fraction of the time between samples. A fixed delay 31 delays a write enable signal to the FIFO buffer 22 so that a total delay of the variable delay interface 28 is a sum of the fixed delay, the FIFO buffer delay and the delay of the signal processing delay unit 30.

The samples output by the signal processing delay unit 30 are input to the FIFO buffer 32 which introduces a variable but measurable delay that is the sum of the FIFO buffer delay and the fixed delay 31. The actual delays from the signal processing delay unit 30 and the FIFO buffer 32 are input to the delay control unit 23 which determines the total delay as the some of these two actual delays. The delay control unit 23 outputs a rate control signal that is based on the difference between the total delay and a target delay from an external source. The rate control signal is received by the signal processing delay unit 30 which adjusts its delay in response to the rate control signal.

Thus, an REC 36 produces frames of intermediate frequency (IF) digitally sampled signals to a deframing unit 38 which deframes the framed signals from the REC 36 to produce a signal input to the signal processing delay unit 30. Conversely, the output of the FIFO buffer 22 is framed by a framing unit 40 and input to the RE 42. The delay introduced between the input from the REC 36 to the output to the RE 42 is therefore continuously variable to achieve any desired delay.

The variable rate change filter 20 is therefore capable of providing a precise measure of the delay through the VRCF 20 and accepting a rate control signal controlling the precise rate at which the VRCF 20 is to sample the input signal. The FIFO buffer 22 is capable of providing a precise measure of the delay of the FIFO buffer 22. A control loop including a loop filter 26 controls the VRCF operating frequency based on the current delay through the variable delay interface 18 and the target delay.

The variable delay interface 18 of FIGS. 4 and 5 may be implemented in hardware or in combination of hardware and software. For example, the FIFO buffer 22 may be implemented as random access memory components that are clocked to cycle the samples through the memory from an input port to an output port. The VRCF 20 may be implemented as a memory and a digital signal processor that is programmable with software which, when executed by the digital signal processor, causes the digital signal processor to perform the sampling and delay as described above. Alternatively, the VRCF 20 can be implemented as a field programmable gate array that is configured to perform the functions of the VRCF 20 described above. The delay estimation unit 24 may be implemented by solid state memory and an adder. Loop filter 26 may be implemented with discrete components, including operational amplifiers, for example. The fixed delay 31 may be implemented as shift registers, for example. The elements of variable delay interface 18 may be implemented in a single physical package such as an integrated circuit, may be implemented as part of the overall processing circuitry, i.e., processor, memory and other hardware of the network node 14 and/or may be implemented using multiple physical components.

Figure 6:
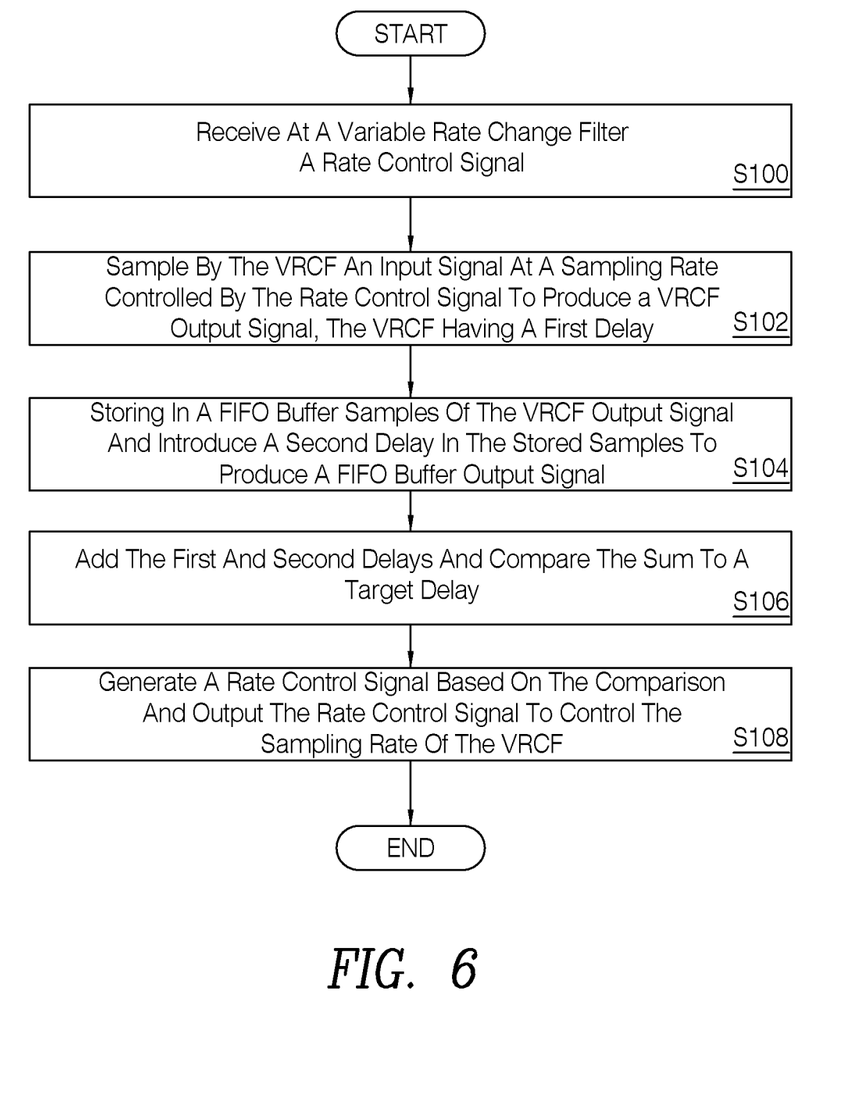
FIG. 6 is a flowchart of an exemplary process to introduce a controllable, variable delay between a first equipment and a second equipment

FIG. 6 is flowchart of an exemplary process of introducing a controllable, variable delay between a first equipment and a second equipment. In some embodiments, the first and second equipment may be plesio-synchronous. The process includes receiving at a rate control input of a VRCF 20, a rate control signal (block S100). The process also includes sampling by the VRCF 20 an input signal at a sampling rate controlled by the rate control signal to produce a VRCF output signal, the VRCF 20 having a first delay (block S102).

The process also includes storing in a FIFO buffer 22, samples of the VRCF output signal and introducing a second delay in the stored samples to produce a FIFO buffer output signal (block S104). The process also includes adding, via the delay estimation unit 24 the first and second delays and comparing, via the subtractor 25, the sum to a target delay (block S106). The process also includes generating via the loop filter 26, the rate control signal based on the comparison; and outputting the rate control signal to the VRCF rate control input to control the sampling rate of the VRCF 20 (block S108).

Thus, in some embodiments, a variable delay interface 18 and method to introduce a controllable, variable delay between a first and second equipment are provided. According to one aspect, the variable delay interface 18 includes a variable rate change filter, VRCF, 20 having a signal input, a signal output, and a rate control input. The VRCF 20 is configured to receive a rate control signal at the rate control input and sample an input signal received at the signal input at a sampling rate controlled by the rate control signal to produce a VRCF output signal. Also, the VRCF 20 has a first delay which can be an integer sample delay plus an arbitrarily accurate fractional sample delay. The variable delay interface 18 includes a first in first out, FIFO, buffer 22 having an input and an output, the FIFO buffer 22 configured to store samples of the VRCF output signal received at the FIFO buffer input and introduce a second integer sample delay in the stored samples to produce a FIFO buffer output signal at the FIFO buffer output. A delay control unit 23 is configured to add the first and second delays to produce a total delay. The delay control unit 23 is also configured to compare the total delay to a target delay and generate the rate control signal based on the comparison. The delay control unit 23 outputs the rate control signal to the VRCF rate control input, the rate control signal causing one of no change, an increase and a decrease of the sampling rate of the VRCF 20.

In some embodiments, the first equipment is a radio equipment controller and the second equipment is a radio equipment. In some embodiments, when the total delay is less than the target delay, the rate control signal causes an increase in the sampling rate of the VRCF 20. In some embodiments, when the total delay is greater than the target delay, the rate control signal causes a decrease in the sampling rate of the VRCF 20. In some embodiments, the rate control signal is generated by a loop filter 26. In some embodiments, the first delay is a fraction of a time between samples of the VRCF output signal. In some embodiments, the second delay is an integer multiple of a time between samples of the VCRF output signal.

In some embodiments, the FIFO buffer 22 is responsive to an input clock and an output clock, the input clock being received from the first equipment and the output clock being received from the second equipment. In some embodiments, a fixed delay is introduced into a path of a write enable signal to the FIFO buffer 22 to add delay to the second delay. In some embodiments, a deframing unit 38 is in communication with the input of the VRCF 20 to interface between the first equipment and the VRCF 20 and a framing unit 40 is in communication with the output of the FIFO buffer 22 to interface between the FIFO buffer 22 and the second equipment.

In some embodiments, method of introducing a controllable, variable delay between a first equipment and a second equipment is provided. The method includes receiving at a rate control input of a variable rate change filter, VRCF, 20 a rate control signal (S100). The method includes sampling by the VRCF 20 an input signal at a sampling rate controlled by the rate control signal to produce a VRCF output signal, the VRCF 20 having a first delay (S102). The method also includes storing in a first in first out, FIFO, buffer 22, samples of the VRCF output signal and introducing a second delay in the stored samples to produce a FIFO buffer output signal (S104). The method further includes adding the first and second delays to produce a total delay, comparing the total delay to a target delay and generating the rate control signal based on the comparison (S106). The method further includes outputting the rate control signal to the VRCF rate control input, the rate control signal causing one of no change, an increase and a decrease of the sampling rate of the VRCF 20 (S108).

In some embodiments, the first equipment is a radio equipment controller and the second equipment is a radio equipment. In some embodiments, when the total delay is less than the target delay, the rate control signal causes an increase in the sampling rate of the VRCF 20. In some embodiments, when the total delay is greater than the target delay, the rate control signal causes a decrease in the sampling rate of the VRCF 20. In some embodiments, the rate control signal is generated by a loop filter 26. In some embodiments, the first delay is a fraction of a time between samples of the VRCF output signal. In some embodiments, the second delay is an integer multiple of a time between samples of the VCRF output signal. In some embodiments, the FIFO buffer 22 is responsive to an input clock and an output clock, the input clock received from the first equipment and the output clock received from the second equipment.

In some embodiments, the method includes providing a fixed delay introduced into a path of a write enable signal to the FIFO buffer 22 to add delay to the second delay. In some embodiments, the method includes providing a deframing unit 38 in communication with the VRCF 20 to interface between the first equipment and the VRCF 20 and providing a framing unit 40 in communication with to the FIFO buffer 22 to interface between the FIFO buffer 22 and the second equipment.

In some embodiments, a variable delay interface 18 configured to introduce a controllable, variable delay between a radio equipment controller and a radio equipment is provided. The interface 28 includes a variable rate change filter, VRCF, 20 having a signal input, a signal output and a rate control input. The VRCF 20 is configured to receive a rate control signal at the rate control inputs and sample an input signal received at the signal input at a sampling rate controlled by a rate control signal to produce a VRCF output signal. The sampling rate is one of greater than and less than a sampling rate of the input signal. The VRCF 20 has a first delay. The interface 18 includes a first in first out, FIFO, buffer 22 having an input and an output, the FIFO buffer 22 configured to store samples of the VRCF output signal received at the FIFO buffer 22.

| Abbreviation | Explanation |
| --- | --- |
| BTS | Base Station |
| CPRI | Common Public Radio Interface |
| FIFO | First In First Out |

-continued

| Abbreviation | Explanation |
| --- | --- |
| RE | Radio Equipment |
| REC | Radio Equipment Controller |
| VRCF | Variable Rate Change Filter |
| XMU | AuXiliary Multiplexing Unit |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A variable delay interface configured to introduce a controllable, variable delay between a first equipment and a second equipment, the variable delay interface comprising:
    a variable rate change filter, VRCF, having a signal input, a signal output, and a rate control input, the VRCF configured to:
        receive a rate control signal at the rate control input; and
        sample an input signal received at the signal input at a sampling rate controlled by the rate control signal to produce a VRCF output signal;
        the VRCF having a first delay;
    a first in first out, FIFO, buffer having an input and an output, the FIFO buffer configured to store samples of the VRCF output signal received at the FIFO buffer input and introduce a second delay in the stored samples to produce a FIFO buffer output signal at the FIFO buffer output; and
    a delay control unit configured to:
        add the first and second delays to produce a total delay;
        compare the total delay to a target delay;
        generate the rate control signal based on the comparison; and
        output the rate control signal to the VRCF rate control input, the rate control signal causing one of no change, an increase and a decrease of the sampling rate of the VRCF.

2. The variable delay interface of claim 1, wherein the first equipment is a radio equipment controller and the second equipment is a radio equipment.

3. The variable delay interface of claim 1, wherein, when the total delay is less than the target delay, the rate control signal causes an increase in the sampling rate of the VRCF.

4. The variable delay interface of claim 1, wherein, when the total delay is greater than the target delay, the rate control signal causes a decrease in the sampling rate of the VRCF.

5. The variable delay interface of claim 1, wherein the rate control signal is generated by a loop filter.

6. The variable delay interface of claim 1, wherein the first delay is a fraction of a time between samples of the VRCF output signal.

7. The variable delay interface of claim 1, wherein the second delay is an integer multiple of a time between samples of the VCRF output signal.

8. The variable delay interface of claim 1, wherein the FIFO buffer is responsive to an input clock and an output clock, the input clock being received from the first equipment and the output clock being received from the second equipment.

9. The variable delay interface of claim 1, further comprising a fixed delay introduced into a path of a write enable signal to the FIFO buffer to add delay to the second delay.

10. The variable delay interface of claim 1, further comprising a deframing unit in communication with the input of the VRCF to interface between the first equipment and the VRCF and a framing unit in communication with the output of the FIFO buffer to interface between the FIFO buffer and the second equipment.

11. A method of introducing a controllable, variable delay between a first equipment and a second equipment, the method comprising:
    receiving at a rate control input of a variable rate change filter, VRCF, a rate control signal;
    sampling by the VRCF an input signal at a sampling rate controlled by the rate control signal to produce a VRCF output signal; and
    the VRCF having a first delay;
    storing in a first in first out, FIFO, buffer, samples of the VRCF output signal and introducing a second delay in the stored samples to produce a FIFO buffer output signal;
    adding the first and second delays to produce a total delay;
    comparing the total delay to a target delay;
    generating the rate control signal based on the comparison; and
    outputting the rate control signal to the VRCF rate control input, the rate control signal causing one of no change, an increase and a decrease of the sampling rate of the VRCF.

12. The method of claim 11, wherein the first equipment is a radio equipment controller and the second equipment is a radio equipment.

13. The method of claim 11, wherein, when the total delay is less than the target delay, the rate control signal causes an increase in the sampling rate of the VRCF.

14. The method of claim 11, wherein, when the total delay is greater than the target delay, the rate control signal causes a decrease in the sampling rate of the VRCF.

15. The method of claim 11, wherein the rate control signal is generated by a loop filter.

16. The method of claim 11, wherein the first delay is a fraction of a time between samples of the VRCF output signal.

17. The method of claim 11, wherein the second delay is an integer multiple of a time between samples of the VCRF output signal.

18. The method of claim 11, wherein the FIFO buffer is responsive to an input clock and an output clock, the input clock received from the first equipment and the output clock received from the second equipment.

19. The method of claim 11, further comprising providing a fixed delay introduced into a path of a write enable signal to the FIFO buffer to add delay to the second delay.

20. The method of claim 11, further comprising providing a deframing unit in communication with the VRCF to interface between the first equipment and the VRCF and providing a framing unit in communication with to the FIFO buffer to interface between the FIFO buffer and the second equipment.

21. A variable delay interface configured to introduce a controllable, variable delay between a radio equipment controller and a radio equipment, the interface comprising:
   a variable rate change filter, VRCF, having a signal input, a signal output and a rate control input, the VRCF configured to:
      receive a rate control signal at the rate control inputs; and
      sample an input signal received at the signal input at a sampling rate controlled by a rate control signal to produce a VRCF output signal, the sampling rate being one of greater than and less than a sampling rate of the input signal;
   the VRCF having a first delay;
   a first in first out, FIFO, buffer having an input and an output, the FIFO buffer configured to store samples of the VRCF output signal received at the FIFO buffer input and introduce a delay that proportional to a sampling rate of the received samples to produce a second delay; and
   a delay control unit configured to generate the rate control signal, the rate control signal being based on a sum of the first and second delays and a target delay received by the delay control unit, the rate control signal causing an increase in the sampling rate of the VRCF when the sum is less than the target delay and causing a decrease in the sampling rate of the VRCF when the sum is greater than the target delay.

* * * * *